United States Patent
Deng et al.

(10) Patent No.: US 12,037,189 B2
(45) Date of Patent: Jul. 16, 2024

(54) WASTE COLLECTION EQUIPMENT

(71) Applicant: CONTEMPORARY AMPEREX TECHNOLOGY CO., LIMITED, Ningde (CN)

(72) Inventors: Zhiyong Deng, Ningde (CN); Ruchu Yu, Ningde (CN); Yinyong Qiao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/446,493

(22) Filed: Aug. 9, 2023

(65) Prior Publication Data

US 2024/0017915 A1 Jan. 18, 2024

Related U.S. Application Data

(63) Continuation of application No. PCT/CN2022/100527, filed on Jun. 22, 2022.

(30) Foreign Application Priority Data

Sep. 1, 2021 (CN) .......................... 202111019555.7

(51) Int. Cl.
*B30B 9/30* (2006.01)
*B30B 15/00* (2006.01)
*B65F 1/14* (2006.01)

(52) U.S. Cl.
CPC ............ *B65F 1/1405* (2013.01); *B30B 9/301* (2013.01); *B30B 15/0052* (2013.01); *B65F 2210/162* (2013.01); *B65F 2210/167* (2013.01)

(58) Field of Classification Search
CPC ..... B30B 15/0052; B30B 9/301; B30B 9/327; B30B 3/32; B65F 1/1405; B65F 2210/162; B65F 2210/167
See application file for complete search history.

(56) References Cited

U.S. PATENT DOCUMENTS 3,063,363 A * 11/1962 Lamb .................... B30B 15/062
100/126
4,829,911 A 5/1989 Nielson

FOREIGN PATENT DOCUMENTS

CN 206883762 U 1/2018
CN 209902490 U 1/2020
(Continued)

OTHER PUBLICATIONS

English translation of CN209902490U, Wu et al., 2020, 9 pages. (Year: 2023).*

(Continued)

*Primary Examiner* — Jimmy T Nguyen
(74) *Attorney, Agent, or Firm* — Kilpatrick Townsend & Stockton LLP

(57) ABSTRACT

Embodiments relate to the technical field of waste collection, in particular to waste collection equipment, which includes a temporary storage tank, a pressing tank and a pressing mechanism; the temporary storage tank is configured for receiving and temporarily storing wastes produced by die cutting equipment; the pressing tank is configured for carrying the wastes in the temporary storage tank; the pressing mechanism is configured for compressing the wastes in the pressing tank; the temporary storage tank is provided with a first blanking port, which is configured for communicating the temporary storage tank with the pressing tank; the first blanking port is provided with a first valve; and the first valve is configured for opening or closing the first blanking port to control whether the temporary storage tank discharges the wastes.

13 Claims, 7 Drawing Sheets

(56) References Cited

FOREIGN PATENT DOCUMENTS

| | | |
|---|---|---|
| CN | 111230575 A | 6/2020 |
| CN | 211682429 U | 10/2020 |
| CN | 212146704 U | 12/2020 |
| CN | 113231877 A | 8/2021 |
| CN | 216096075 U | 3/2022 |
| FR | 2671514 A1 | 7/1992 |
| JP | H05200594 A1 * | 8/1993 ............. B30B 9/321 |
| WO | 03012013 A1 | 2/2003 |

OTHER PUBLICATIONS

International Search Report received in the corresponding International Application PCT/CN2022/100527, mailed Sep. 26, 2022.
The extended European search report received in the corresponding European Application 22862822.8, mailed on Jun. 3, 2024.

* cited by examiner

A-A

WASTE COLLECTION EQUIPMENT

CROSS-REFERENCE

The present application is a continuation of International Application PCT/CN2022/100527, filed Jun. 22, 2022, which claims the priority of Chinese Patent Application No. 202111019555.7 filed on Sep. 1, 2021 and entitled "WASTE COLLECTION EQUIPMENT", the entire contents of which are incorporated herein by reference.

TECHNICAL FIELD

Embodiments of the present application relate to the technical field of waste collection, and in particular, to waste collection equipment.

BACKGROUND

With the development of the modern society and the increasingly prominent energy and environment issues, new energy vehicles are also more and more popular, and lithium batteries are widely used in the fields of hybrid electric vehicles and electric vehicles.

Basic materials of a lithium battery include a positive electrode sheet and a negative electrode sheet. Before winding, it is necessary to perform die cutting on a metal pole piece to make it reach a required width. The die cutting process often brings metal wastes which are scattered on the ground of a workshop, affecting the cleanliness of the environment and posing safety hazards. The metal wastes need to be cleaned up.

SUMMARY OF THE INVENTION

In view of the above problems, an embodiment of the present application provides waste collection equipment, which can collect metal wastes and reduce the frequency of manual cleaning of the wastes.

The waste collection equipment provided in this embodiment of the present application includes: a temporary storage tank, a pressing tank and a pressing mechanism; the temporary storage tank is configured for receiving and temporarily storing wastes produced by die cutting equipment; the pressing tank is configured for carrying the wastes in the temporary storage tank; the pressing mechanism is configured for compressing the wastes in the pressing tank; the temporary storage tank is provided with a first blanking port, which is configured for communicating the temporary storage tank with the pressing tank; the first blanking port is provided with a first valve; and the first valve is configured for opening or closing the first blanking port to control whether the temporary storage tank discharges the wastes.

By means of the above solution, when the first valve is opened, the metal wastes produced by the die cutting equipment first falls into the temporary storage tank, and then falls into the pressing tank through the first blanking port. The pressing mechanism can compress the wastes in the pressing tank to make the incompact metal wastes deform to form a denser metal waste block. In the pressing process, the first valve can be closed to close the first blanking port, so as to separate the temporary storage tank from the space of the pressing tank to prevent the wastes in the temporary storage tank from being continuously poured into the pressing tank in the process of compressing the wastes by the pressing mechanism, which will affect the normal operation of the pressing mechanism and reduce the compactness of the metal waste block. After the pressing is completed, the first valve is reopened to make the wastes fall from the temporary storage tank into the pressing tank for being compressed in the next pressing process. In this solution, the wastes are collected through the temporary storage tank to prevent the wastes from being scattered in a workshop and affecting the safety of the environment, people and equipment in the workshop. The wastes are compressed by the pressing mechanism, thereby reducing the space occupied by the wastes and reducing the frequency of cleaning the wastes. The first blanking port is arranged between the temporary storage tank and the pressing tank, and the first valve is arranged at the first blanking port, so that the wastes in the temporary storage tank can be directly discharged into the pressing tank by means of opening the first valve.

In some embodiments, multiple penetrated first gas holes are arranged on a side wall of the temporary storage tank to receive external gas flow, so that the wastes fall off from the first blanking port.

By means of the above solution, when the first valve is opened, the external equipment blows gas to the temporary storage tank through the first gas holes, so that the wastes in the temporary storage tank fall from the first blanking port into the pressing tank, and the falling of the wastes is accelerated. Furthermore, such a phenomenon that the wastes are stuck in the temporary storage tank and cannot fall completely is prevented.

In some embodiments, sections of the temporary storage tank along the horizontal direction narrow gradually from top to bottom, and the first blanking port is located on the smallest section of the temporary storage tank, so as to reduce remaining wastes in the temporary storage tank.

By means of the above solution, the section of the temporary storage tank along the horizontal direction gradually narrows from top to bottom, which helps the wastes collected in the temporary storage tank to be concentrated at the first blanking port under the action of its own gravity and to fall off from the first blanking port, so that the wastes fall off more thoroughly, which reduces the remaining residues in the temporary storage tank.

In some embodiments, the waste collection equipment further includes a waste pipe, which is configured for making the wastes produced by the die cutting equipment flow into the temporary storage tank through the waste pipe.

By means of the above solution, the requirement for a mounting position of the waste collection equipment is relatively low, and an arrangement direction and length of the waste pipe are used to adapt to the position of the waste collection equipment relative to the die cutting equipment, so that the mounting position and space for the waste collection equipment are less limited.

In some embodiments, the waste collection equipment further includes a gas pressure control device, which is configured for controlling the gas pressure in the temporary storage tank to be less than the gas pressure of a feed port of the waste pipe, so as to change the speed at which the wastes flow into the temporary storage tank through the waste pipe.

By means of the above solution, the wastes are made to flow from the feed port of the waste pipe to the temporary storage tank through a gas pressure difference at both ends of the waste pipe, and a flow rate of the wastes is controlled by controlling the gas pressure difference, so as to meet actual production needs. The equipment is higher in adaptability.

In some embodiments, the gas pressure control device is connected with a gas pressure pipe. The gas pressure pipe is at least partially located in the temporary storage tank, and the gas pressure pipe is provided with a gas pressure control port, which is configured for enabling the inner cavity of the gas pressure pipe to be in gas communication with the temporary storage tank to control the gas pressure in the temporary storage tank.

By means of the above solution, the gas pressure control device extracts gas in the temporary storage tank through the gas pressure control port on the gas pressure pipe, or blows gas into the temporary storage tank, and further controls the gas pressure in the temporary storage tank by means of controlling an gas extraction speed or blowing speed, thereby controlling a speed at which the wastes flow into the temporary storage tank, which is convenient and easy to implement.

In some embodiments, the part of the gas pressure pipe located inside the temporary storage tank is located at an inner upper side of the temporary storage tank to prevent the wastes from blocking the gas pressure control port.

By means of the above solution, the wastes entering the temporary storage tank falls below the temporary storage tank under the action of gravity, thereby reducing the wastes accumulated on a wall of the gas pressure pipe, and preventing the wastes from approaching the gas pressure control port under the action of the gas pressure to block the gas pressure control port.

In some embodiments, an isolation plate is arranged inside the temporary storage tank and is configured for isolating the gas pressure control port from a discharge port of the waste pipe, and the two sides of the isolation plate are in gas communication.

By means of the above solution, the isolation plate isolates the wastes in the temporary storage tank from the gas pressure control port, which further prevents the wastes from blocking the gas pressure control port under the action of gas pressure.

In some embodiments, the pressing tank includes:
a blanking chamber, which is configured for receiving the wastes from the temporary storage tank through the first blanking port;
a pressing chamber, which is configured for receiving the wastes from the blanking chamber and defining a compression region for the wastes; and
a guide member, which is configured for guiding the wastes from the blanking chamber into the pressing chamber.

By means of the above solution, the wastes falling through the first blanking port is more concentrated. Since the wastes are first made to enter the blanking chamber and then enter the pressing chamber through the guide member, the relatively concentrated wastes discharged from the first blanking port are dispersed in the pressing chamber. Thus, the metal waste block compressed by the pressing mechanism is more uniform in density at different positions, and is not easy to disperse, which facilitates the cleaning and transportation of the waste block.

In some embodiments, second gas holes are formed in the side wall of the pressing chamber away from the blanking chamber. The second gas holes are connected outside the pressing tank with the gas pressure control device to enable the wastes to fall to one side of the pressing chamber away from the blanking chamber.

By means of the above solution, under the action of their own gravity, the wastes will be preferentially accumulated on one side of the waste chamber close to the blanking chamber, which may cause the wastes to be distributed in the pressing chamber non-uniformly and reduce the quality of a pressing-molded waste block. The gas pressure control device drives, by means of making the gas flow in the pressing chamber to flow close to the second gas holes, lighter wastes to move away from the blanking chamber, which helps to uniformly distribute the wastes in the pressing chamber and in turn helps to improve the quality of the pressing-molded waste block and prevent the waste block from being scattered in cleaning and transportation.

In some embodiments, the pressing mechanism includes a pressing plate, which is configured for compressing the wastes in the pressing chamber; the pressing plate is provided with third gas holes passing through two sides thereof; and the third gas holes are configured for discharging the gas between the wastes while the wastes are compressed.

By means of the above solution, during the compression, the gas in spaces between the wastes can be discharged from the third gas holes, so that the pressing plate can continue to press the wastes forward.

In some embodiments, one side of the pressing plate in contact with the wastes has protruding support blocks, which are configured for pressing the wastes, and the support blocks are arranged in a manner of avoiding the third gas holes.

By means of the above solution, the support blocks are located between the pressing plate and the wastes, which prevents the third gas holes from being blocked due to a too close contact between the third gas holes and the wastes in the process of pressing the wastes. Meanwhile, the support block can prevent an edge of the pressing plate from deforming since the deformation will loosen the edge of the waste block, and the waste block is prevented from being broken up.

In some embodiments, the support blocks are non-metal blocks.

By means of the above solution, the support blocks are in direct contact with the metal wastes, thereby preventing the metal wastes from being in direct contact with the pressing plate and from scratching and damaging the pressing plate under a high pressure.

In some embodiments, the waste collection equipment further includes a waste bin, which is configured for collecting the wastes in the pressing tank.

By means of the above solution, the waste block that has been compressed in the pressing tank is collected in the waste bin, thereby freeing up the space in the pressing tank for wastes in the temporary storage tank. In addition, the waste bin can temporarily store the waste block. Since the wastes in the waste block have a large density, a waste bin with the same capacity can accommodate more wastes, and a time interval between two adjacent cleanings of the waste bin is longer, which reduces the frequency of manual cleaning of wastes.

In some embodiments, a sealing assembly is arranged between the bottom wall of the pressing tank and the waste bin, and is configured for preventing the wastes from spilling out of the waste bin. The sealing assembly includes:
an upper sealing plate, which is connected to the bottom of the pressing tank;
a lower sealing plate, which is configured for pressing against an edge of an opening of the waste bin;
a sealing cover, which is connected between the upper sealing plate and the lower sealing plate to realize sealing between the upper sealing plate and the lower sealing plate.

By means of the above solution, the sealing assembly realizes the sealing between the pressing tank and the waste bin, which prevents smaller waste particles from falling out from the edge of the opening of the waste bin when the waste block falls from the pressing tank to the waste bin.

In some embodiments, the sealing assembly further includes:

a driving member, which is configured for driving the lower sealing plate to move relative to the upper sealing plate, so that the lower sealing plate presses against or is separated from the edge of the opening of the waste bin.

By means of the above solution, when the driving member drives the lower sealing plate to be separated from the opening of the waste bin, the waste bin can be taken out, and the waste block collected in the waste bin can be cleaned; when the wastes in the waste bin are cleaned up, the waste bin is placed at an original position, and the driving member drives the lower sealing plate to be close to the edge of the opening of the waste bin and to press against the edge of the opening of the waste bin, thereby continuing to achieve sealing between the pressing tank and the waste bin.

The above descriptions are only a summary of the technical solutions of the embodiments of the present application. In order to be able to understand the technical means of the embodiments of the present application more clearly, the technical means can be implemented according to the content of the specification. Furthermore, in order to make the above and other objectives, features and advantages of the embodiments of the present application more comprehensible, specific implementations of the present application are exemplified below.

DESCRIPTION OF THE DRAWINGS

In order to illustrate the technical solutions of the embodiments of the present application more clearly, the following briefly introduces the accompanying drawings required in the description of the embodiments. Obviously, the accompanying drawings described below are some embodiments of the present application. Those of ordinary skill in the art can also obtain other drawings according to the drawings without any creative work.

Figure 1:
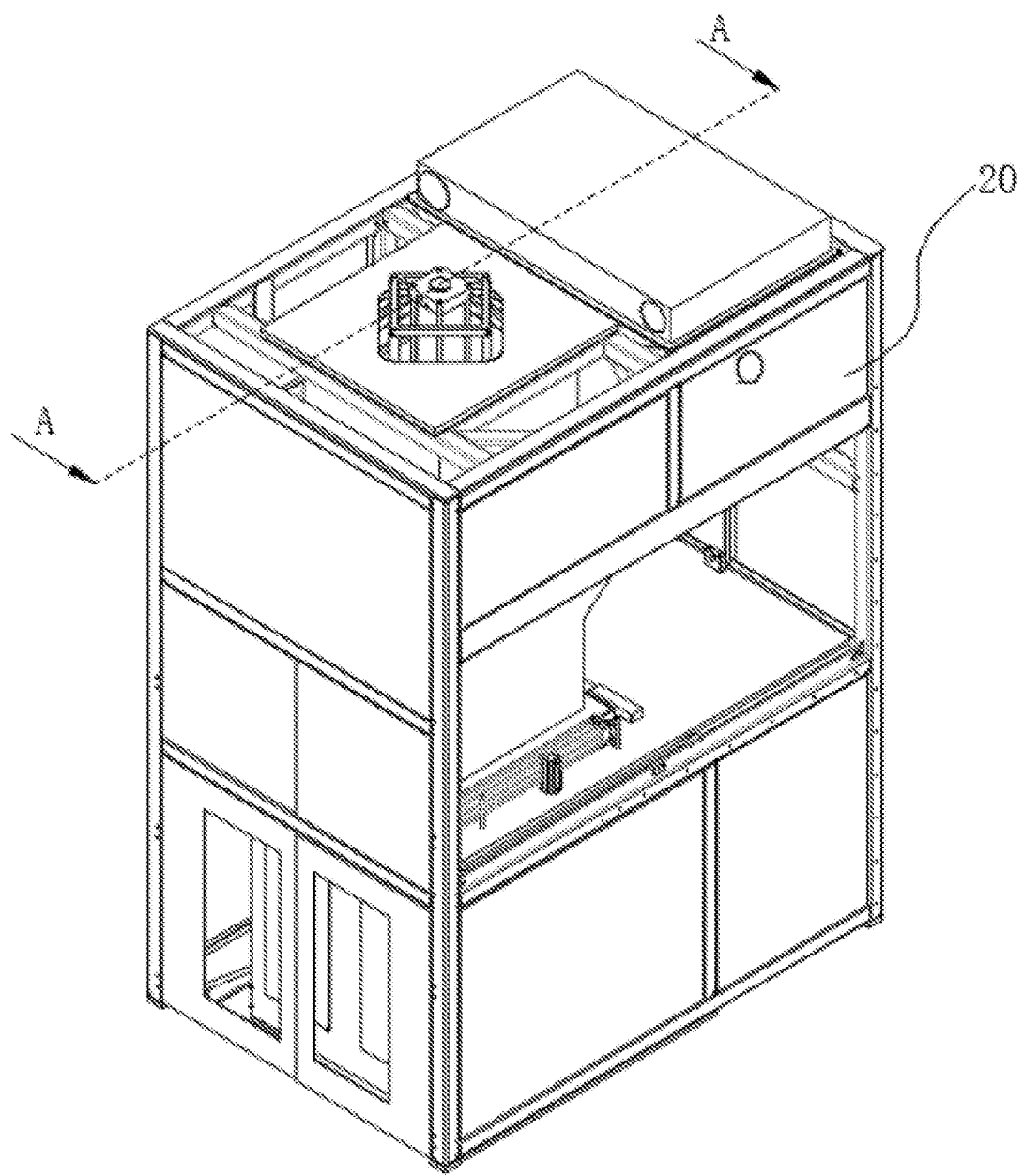
FIG. 1 is a schematic diagram of an overall structure of waste collection equipment of one embodiment of the present application.

Description of reference numerals: 1. temporary storage tank; 11. first gas hole; 2. waste pipe; 3. gas pressure pipe; 31. gas pressure control port; 4. isolation plate; 41. hole; 5. first blanking port; 6. first valve; 61. guide rail; 62. retaining plate; 63. first cylinder; 7. pressing tank; 71. blanking chamber; 72. pressing chamber; 73. guide member; 74. second gas hole; 75. second blanking port; 76. second valve; 8. pressing mechanism; 81. pressing plate; 811. third gas hole; 812. support block; 82. second cylinder; 9. waste bin; 10. sealing assembly; 101. upper sealing plate; 102. lower sealing plate; 103. sealing cover; 104. driving member; 1041. third cylinder; 105. guide rod; 106. guide hole; and 20. frame.

DETAILED DESCRIPTION

In order to make the objectives, technical solutions and advantages of the embodiments of the present application clearer, the technical solutions in the embodiments of the present application will be clearly and completely described below with reference to the drawings in the embodiments of the present application, and it is obvious that the described embodiments are part of the embodiments of the present application, but not all of them. Based on the embodiments of the present application, all other embodiments obtained by those ordinarily skilled in the art without creative effort shall fall within the protection scope of the present application.

Unless otherwise defined, all technical and scientific terms used herein have the same meaning as commonly understood by those skilled in the art of the present application. The terms used in the specification herein are intended only for the purpose of describing specific embodiments and are not intended to limit the present application.

The terms "include" and "have" as well as any variations thereof in the specification, claims and descriptions of the drawings of the present application are intended to cover but not exclude other contents. The word "a" or "an" does not exclude the presence of plurality.

Reference to "an embodiment" herein means that a particular feature, structure or characteristic described in conjunction with an embodiment may be included in at least one embodiment of the present application. The appearance of this phrase "embodiment" in various positions in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

All orientation words appearing in the following descriptions are directions shown in the figures, and do not limit the specific structure of waste collection equipment of the present application. For example, in the description of the present application, orientations or positional relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential" and the like are orientations or positional relationships as shown in the drawings, and are only for the purpose of facilitating and simplifying the description of the present application instead of indicating or implying that devices or elements indicated must have particular orientations, and be constructed and operated in the particular orientations, so that these terms are not construed as limiting the present application.

In addition, the terms "first" and "second" in the specification and claims of the present application or the above drawings are used to distinguish different objects, not to describe a specific order, and may explicitly or implicitly include one or more of the features.

In the description of the present application, unless otherwise stated, the term "multiple" refers to two or more (including two), and similarly, "multiple groups" refers to two or more (including two) groups.

In the description of the present application, it should be noted that, unless otherwise clearly specified and limited, the terms "mount", "connect" and "connection" should be understood in a broad sense. For example, "connect" or "connection" of mechanical structures may refer to a physical connection. For example, the physical connection may be a fixed connection, such as a fixed connection through a fixing member or through a screw, a bolt or other fixing members. The physical connection may also be a detachable connection, such as mutual clamping or snap-in connection. The physical connection may also be an integral connection, such as welding, bonding or integral connection. The "connect" or "connection" of a circuit structure may not only refer to a physical connection, but also an electrical connection or a signal connection. For example, it may be a direct connection, that is, a physical connection, or an indirect connection through at least one intermediate component, as long as the circuit is connected. It can also be an internal connection of two elements. In addition to achievement through a circuit, the signal connection can also be achieved through media, for example, radio waves. Those of ordinary skill in the art can understand the specific meanings of the above terms in the present application according to specific situations.

Cells are basic units constituting a battery. A cell includes a shell, an electrode assembly and an electrolyte solution. The electrode assembly is composed of a positive electrode sheet, a negative electrode sheet and a separator. The cell operates mainly relying on movement of metal ions between the positive electrode sheet and the negative electrode sheet. The positive electrode sheet includes a positive electrode current collector and a positive electrode active material layer. A surface of the positive electrode current collector is coated with the positive electrode active material layer. The positive electrode current collector not coated with the positive electrode active material layer protrudes from the positive electrode current collector that has been already coated with the positive electrode active material layer, and the positive electrode current collector not coated with the positive electrode active material layer serves as a positive tab. A lithium-ion battery is taken as an example. A material of the positive electrode current collector may be aluminum, and a positive electrode active material may be lithium cobalt oxide, lithium iron phosphate, ternary lithium, lithium manganate, and the like. The negative electrode sheet includes a negative electrode current collector and a negative electrode active material layer. A surface of the negative electrode current collector is coated with the negative electrode active material layer. The negative electrode current collector not coated with the negative electrode active material layer protrudes from the negative electrode current collector that has been already coated with the negative electrode active material layer, and the negative electrode current collector not coated with the negative electrode active material layer serves as a negative tab. The material of the negative electrode current collector may be copper, and the negative electrode active material may be carbon, silicon, or the like. In order to ensure that no fusing occurs when a large current passes, there are a plurality of positive tabs which are stacked together, and there are a plurality of negative tabs which are stacked together. A material of the separator may be polypropylene (PP), polyethylene (PE), and the like.

In a manufacturing process of a cell, a raw material of the positive electrode current collector or the negative electrode current collector is often large in size, which needs to be cut into a required shape and size according to the specification of the cell. The cutting process often brings metal wastes. The metal wastes include strip-shaped wastes and granular wastes. The strip-shaped wastes take up a lot of space and need to be cleaned frequently during the collection. The granular wastes are scattered on the floor of a workshop, making it difficult to collect them thoroughly. This not only affects the environmental cleanliness of the workshop, but also poses a safety hazard since these wastes may possibly injure people when people trample on them.

Figure 2:
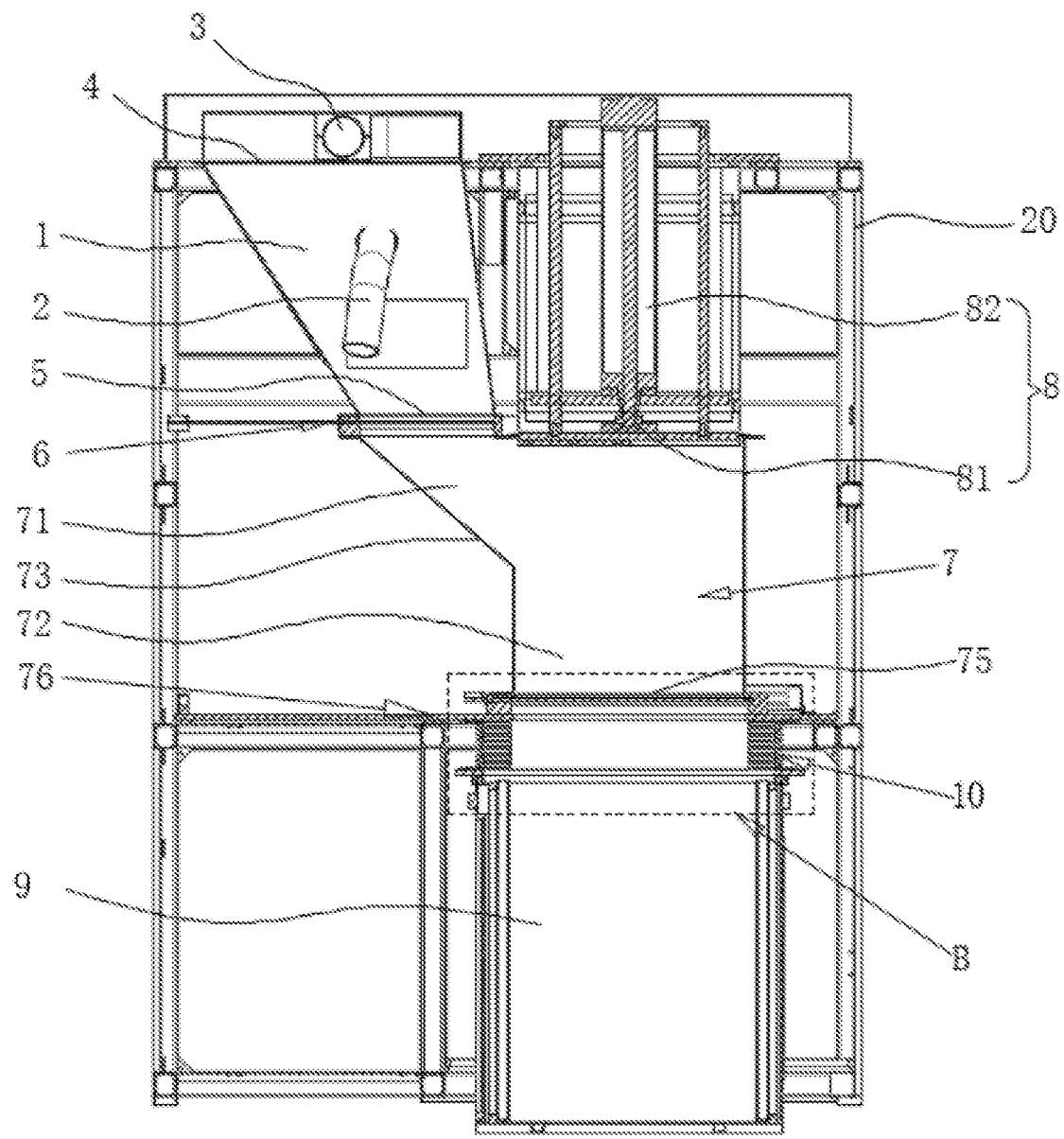
FIG. 2 is a schematic cross-sectional diagram of plane AA in FIG. 1.

In order to solve the problems of waste collection difficulties and frequent cleaning by personnel in the existing technology, as shown in FIG. 1 and FIG. 2, FIG. 1 is a schematic diagram of an overall structure of waste collection equipment of one embodiment of the present application. FIG. 2 is a schematic cross-sectional diagram of plane AA in FIG. 1. An embodiment of the present application provides waste collection equipment, including a temporary storage tank 1, a pressing tank 7 and a pressing mechanism 8. The temporary storage tank 1 is configured for receiving and temporarily storing wastes produced by die cutting equipment. The pressing tank 7 is configured for receiving the wastes in the temporary storage tank 1. The pressing mechanism 8 is configured for compressing the wastes in the pressing tank 7.

The temporary storage tank 1 is provided with a first blanking port 5. The first blanking port 5 communicates the temporary storage tank 1 with the pressing tank 7. The first blanking port 5 is provided with a first valve 6. The first valve 6 is configured for opening or closing the first blanking port 5 to control whether the temporary storage tank 1 discharges the wastes.

In the above embodiment, the communication between the temporary storage tank 1 and the pressing tank 7 may be direct communication through the first blanking port 5. For example, the temporary storage tank 1 and the pressing tank 7 have a public side wall, and the first blanking port 5 penetrates through the common side wall to directly connect the temporary storage tank 1 with the pressing tank 7.

The communication between the temporary storage tank 1 and the pressing tank 7 can also be communication by a conveyer. For example, the conveyer may be a pipeline, a guide groove, a screw conveying mechanism, and the like. One end of the conveyer is connected to the first blanking port 5, and the other end is connected into the pressing tank 7. The wastes discharged from the first blanking port 5 is conveyed into the pressing tank 7 via the conveyer.

The first blanking port 5 may be circular, square or in other shapes, which is not limited in this embodiment of the present application.

Figure 3:
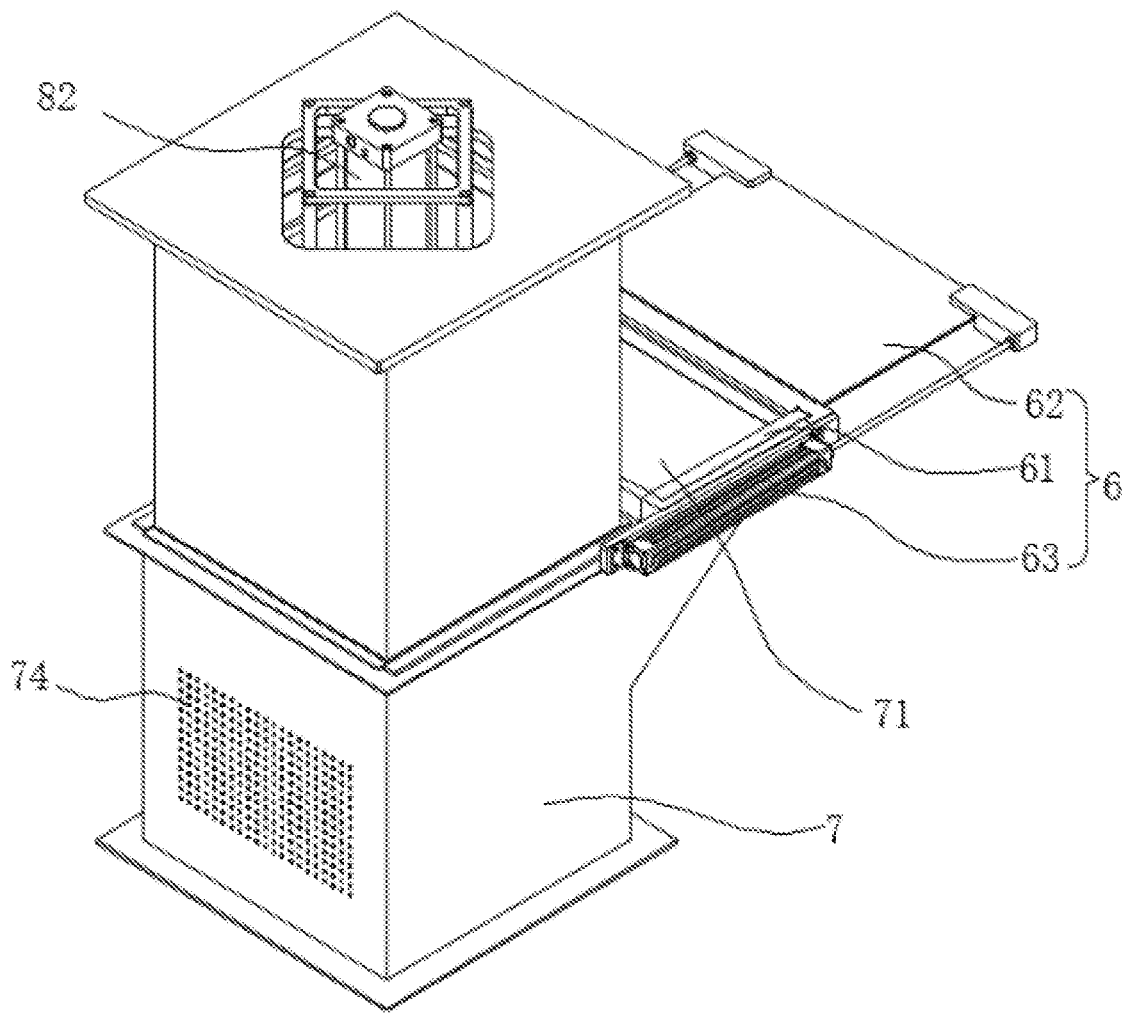
FIG. 3 is a schematic diagram of a first valve of one embodiment of the present application when the first valve is opened.

The first valve 6 may be a standard member or a non-standard member of any structure. When the first valve 6 is a standard member, such as a butterfly valve, its usage is the same as that of the standard member in the existing technology and will not be repeatedly described in this embodiment of the present application. The first valve 6 may be a non-standard member as long as the first valve 6 can flexibly open and close the first blanking port 5. For example, as shown in FIG. 3, FIG. 3 is a schematic diagram of the first valve 6 when the first valve is opened. In some embodiments, the first valve 6 includes guide rails 61, a retaining plate 62 and a first cylinder 63. The guide rails 61 are located on two sides of the first blanking port 5. The two guide rails 61 are parallel to each other. Sides of the two guide rails 61 opposite to each other are provided with clamping slots (not shown in the figure) along a lengthwise direction. An edge of the retaining plate 62 is embedded in the clamping slots. The first cylinder 63 is fixed on a side of the first blanking port 5. An expansion direction of the first cylinder 63 is basically parallel to the lengthwise direction of the guide rails 61. An end portion of a piston rod of the first cylinder 63 is connected to the retaining plate 62. The piston rod of the first cylinder 63 extends out to drive the retaining plate 62 to move away from the first blanking port 5, thereby opening the first blanking port 5 to discharge the wastes in the temporary storage tank 1. The first cylinder 63 retracts back to drive the retaining plate 62 to be close to the first blanking port 5 and gradually block the first blanking port 5, thereby isolating the temporary storage tank 1 from the space of the pressing tank 7, so that the temporary storage tank 1 continues to temporarily store wastes.

The pressing mechanism 8 may cooperate with a side wall of the pressing tank 7 to press the wastes. For example, a certain portion of the pressing mechanism 8 gradually approaches a certain side wall of the pressing tank 7, and a space where the wastes are located is gradually narrowed to compress the wastes.

The working principle of the above embodiment is as follows: When the first valve 6 is opened, the metal wastes produced by the die cutting equipment fall into the temporary storage tank 1 and then falls into the pressing tank 7 from the first blanking port 5 of the temporary storage tank 1. The pressing mechanism 8 can compress the wastes in the pressing tank 7 to make the incompact metal wastes deform to form a denser metal waste block. In the pressing process, the first valve 6 can be closed to close the first blanking port 5, so as to separate the temporary storage tank 1 from the space of the pressing tank 7 to prevent the wastes in the temporary storage tank 1 from being continuously poured into the pressing tank 7 in the process of compressing the wastes by the pressing mechanism 8, which will affect the normal operation of the pressing mechanism 8 and reduce the compactness of the metal waste block. After the pressing is completed, the first valve 6 is then opened, so that the wastes in the temporary storage tank 1 fall into the pressing tank 7 for next compression.

In this solution, the wastes are collected through the temporary storage tank 1 to prevent the wastes from being scattered in a workshop and affecting the safety of the environment, people and equipment in the workshop. The wastes are compressed by the pressing mechanism 8, thereby reducing the space occupied by the wastes and reducing the frequency of cleaning the wastes. The first blanking port 5 is arranged between the temporary storage tank 1 and the pressing tank 7, and the first valve 6 is arranged at the first blanking port 5, so that the wastes in the temporary storage tank 1 can be directly discharged into the pressing tank 7 by means of opening the first valve 6.

Figure 4:
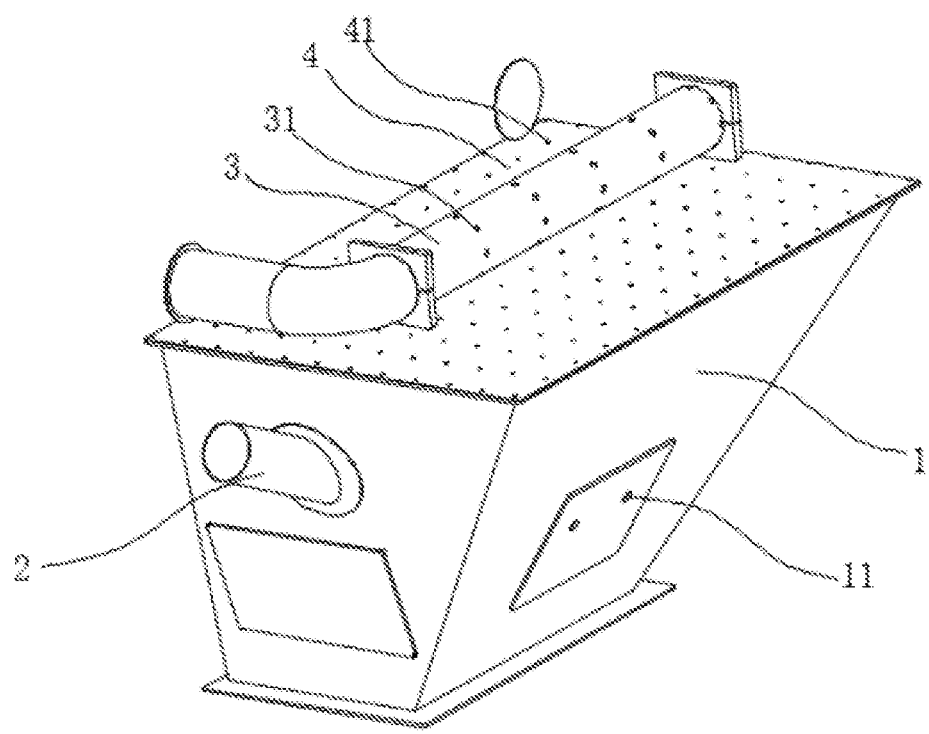
FIG. 4 is a schematic structural diagram of a temporary storage tank in one embodiment of the present application.

As shown in FIG. 4, FIG. 4 is a schematic structural diagram of the temporary storage tank 1. In some embodiments, multiple penetrated first gas holes 11 are arranged on a side wall of the temporary storage tank 1 to receive external gas flow, so that the wastes fall from the first blanking port 5.

There may be one or multiple first gas holes 11. The first gas holes 11 may be round or in other shapes as long as it is ensured that the first gas holes 11 communicate inside with outside of the temporary storage tank 1. For example, the first gas holes 11 may be located on a side wall opposite to the first blanking port 5. Or, when the temporary storage tank 1 has a dead corner inside where the wastes are stuck, the first gas holes 11 may also be located on a side opposite to the dead corner or near to the dead corner, so that when external gas is blown, the wastes are pushed to move by the gas flow and fall off from the first blanking port 5 as thorough as possible.

In the above embodiment, when the first valve 6 is opened, the external equipment blows gas to the temporary storage tank 1 through the first gas holes 11, so that the wastes in the temporary storage tank 1 fall from the first blanking port 5 into the pressing tank 7, and the falling of the wastes is accelerated. Furthermore, such a phenomenon that the wastes are stuck in the temporary storage tank 1 and cannot fall completely is prevented.

As shown in FIG. 2 and FIG. 4, in some embodiments, sections of the temporary storage tank 1 along the horizontal direction narrow gradually from top to bottom, and the first blanking port 5 is located on the smallest section of the temporary storage tank 1, so as to reduce remaining wastes in the temporary storage tank 1.

In some embodiments, the first blanking port 5 can completely cover the smallest section of the temporary storage tank 1, that is, the temporary storage tank 1 does not have a bottom wall, but has an opening formed in a bottom. The size of the opening is equal to that of the smallest section of the first blanking port 5.

In some other embodiments, the size of the first blanking port 5 is less than that of the smallest section of the temporary storage tank 1, that is, the temporary storage tank 1 has a bottom wall, and the first blanking port 5 is formed in the bottom wall of the temporary storage tank 1, but the size of the first blanking port 5 is less than that of the bottom wall to maintain part of the bottom wall.

The section of the temporary storage tank 1 along the horizontal direction gradually narrows from top to bottom, which helps the wastes collected in the temporary storage tank 1 to be concentrated at the first blanking port 5 under the action of its own gravity and to fall off from the first blanking port 5, so that the wastes fall off more thoroughly, which reduces the remaining residues in the temporary storage tank 1.

As shown in FIG. 2 and FIG. 4, in some embodiments, the waste collection equipment further includes a waste pipe 2, which is configured for making the wastes produced by the die cutting equipment flow into the temporary storage tank 1 through the waste pipe 2.

The waste pipe 2 may be a metal pipe or a non-metal pipe. A feed end of the waste pipe 2 is connected to a position where the wastes are produced, such as a waste port of the die cutting equipment, a waste port of a laser chamber, a waste port of a slitting knife, or the like, and a discharge end is connected into the temporary storage tank 1. Exemplarily, the height of the feed end of the waste pipe 2 is greater than that of the discharge end. In this way, the wastes in the waste pipe 2 can flow along the waste pipe 2 into the temporary storage tank 1 at the discharge end under the action of its own gravity, and no external force is required to drive the wastes to flow.

By means of the waste pipe 2, the requirement for a mounting position of the waste collection equipment is lowered, and an arrangement direction and length of the waste pipe 2 are used to adapt to the position of the waste collection equipment relative to the die cutting equipment, so that the mounting position and space for the waste collection equipment are less limited.

In addition, the wastes are conveyed through the waste pipe 2, which can prevent the wastes from spilling out during the conveying and is beneficial to improving the environmental cleanliness of a production site.

In some embodiments, the waste collection equipment further includes a gas pressure control device (not shown in the figure), which is configured for controlling the gas pressure in the temporary storage tank 1 to be less than the gas pressure of a feed port of the waste pipe 2, so as to change the speed at which the wastes flow into the temporary storage tank 1 through the waste pipe 2.

The gas pressure control device may be, for example, a negative pressure fan, a negative pressure pump or the like. gas in the temporary storage tank 1 is extracted through the gas pressure control device, so that the gas pressure in the temporary storage tank 1 is less than that of the feed port of the waste pipe 2. The wastes are made to flow from the feed port of the waste pipe 2 to the temporary storage tank 1 through a gas pressure difference at both ends of the waste pipe 2, and a flow rate of the wastes is controlled by controlling the gas pressure difference, so as to meet actual production needs. The equipment is higher in adaptability.

As shown in FIG. 2 and FIG. 4, in some embodiments, the gas pressure control device is connected with a gas pressure pipe 3. The gas pressure pipe 3 is at least partially located in the temporary storage tank 1, and the gas pressure pipe 3 is provided with a gas pressure control port 31, which is configured for enabling the inner cavity of the gas pressure pipe 3 to be in gas communication with the temporary storage tank 1 to control the gas pressure in the temporary storage tank 1.

The gas pressure pipe 3 may be a telescopic pipe or a non-telescopic pipe. The gas pressure control device extends into the temporary storage tank 1 through the gas pressure pipe 3 to control the gas pressure in the temporary storage tank 1. The gas pressure control port 31 located at the part of the gas pressure pipe 3 extending into the temporary storage tank 1, and may be located at an end portion of the gas pressure pipe 3 or at any position on a pipe wall of the gas pressure pipe 3.

For example, as shown in FIG. 4, in some embodiments, the gas pressure control port 31 is arranged on the pipe wall of the gas pressure pipe 3, and penetrates through the pipe wall of the gas pressure pipe 3. Exemplarily, the gas pressure control port 31 is a round hole with a diameter of 10 mm. Furthermore, there are multiple gas pressure control ports 31. The multiple gas pressure control ports 31 are arranged in an annular array around the pipe wall, and the annular array includes one or more circles. Of course, the position of each gas pressure control port 31 may not necessarily be very accurate, as long as each gas pressure control port 31 can enable the inner cavity of the gas pressure pipe 3 to be in gas communication with the temporary storage tank 1.

By means of the above solution, the gas pressure control device extracts the gas in the temporary storage tank 1 through the gas pressure control port 31 on the gas pressure pipe 3, or blows gas into the temporary storage tank 1, and further controls the gas pressure in the temporary storage tank 1 by means of controlling an gas extraction speed or blowing speed, thereby controlling a speed at which the wastes flow into the temporary storage tank 1, which is convenient and easy to implement.

In addition, since the pipe wall of the gas pressure pipe 3 has a relatively large range, there are many positions for mounting the gas pressure control ports 31. The gas pressure control ports 31 may be dispersedly arranged at multiple positions, so that the gas pressure in the entire temporary storage tank 1 is relatively uniform, so as to prevent a failure of continuously sucking the wastes caused by a too high local gas pressure, or to prevent local accumulation of the wastes caused by a too low local gas pressure.

In some embodiments, the portion of the gas pressure pipe 3 located inside the temporary storage tank 1 is located at an inner upper side of the temporary storage tank 1 to prevent the wastes from blocking the gas pressure control port 31.

By means of the above solution, the gas pressure pipe 3 controls the gas pressure in the temporary storage tank 1 through the gas pressure control port 31, so that the wastes enter the temporary storage tank 1. The wastes entering the temporary storage tank 1 falls below the temporary storage tank 1 under the action of gravity, thereby reducing the wastes accumulated on the wall of the gas pressure pipe 3, and preventing the wastes from approaching, due to the relatively low gas pressure at the gas pressure control port 31, the gas pressure control port 31 and blocking the gas pressure control port 31.

As shown in FIG. 2 and FIG. 4, in some embodiments, an isolation plate 4 is arranged inside the temporary storage tank 1 and is configured for isolating the gas pressure control port 31 from a discharge port of the waste pipe 2, and the two sides of the isolation plate 4 are in gas communication.

In some embodiments, the structure of the isolation plate 4 is a plate member with holes. For example, the isolation plate 4 is a stainless steel plate. Multiple holes 41 are formed in the stainless steel plate, two sides of the isolation plate 4 are communicated through the holes 41, so that the two sides of the isolation plate 4 are in gas communication. The isolation plate 4 in FIG. 4 has the same structure as that of the isolation plate 4 in this embodiment.

In some other embodiments, the isolation plate 4 may be a mesh plate. For example, the isolation plate 4 is woven by metal or non-metal. The isolation plate 4 has dense meshes, so that the gas in the two sides of the isolation plate is communicated.

Exemplarily, the size of each hole 41 or mesh in the isolation plate 4 is less than that of the gas pressure control port 31 on the gas pressure pipe 3. For example, when the diameter of the gas pressure control port 31 on the gas pressure pipe 3 is 10 mm, the diameter of the hole 41 in the isolation plate 4 is less than 10 mm, such as 5 mm, so as to prevent the wastes from passing through the holes in the isolation plate 4 to reach the gas pressure control port 31 on the gas pressure pipe 3 and enter the gas pressure control port 31 to damage the gas pressure control device.

By means of the above solution, when lighter granular wastes in the temporary storage tank 1 moves towards the gas pressure control port 31 under the action of the gas pressure, the isolation plate 4 blocks the wastes on one side away from the gas pressure pipe 3, making it difficult for the wastes to approach the gas pressure control port 31, so as to further prevent the wastes from blocking the gas pressure control port 31 under the action of the gas pressure, so that the gas pressure control port 31 can continuously control the gas pressure in the temporary storage tank 1.

Figure 5:
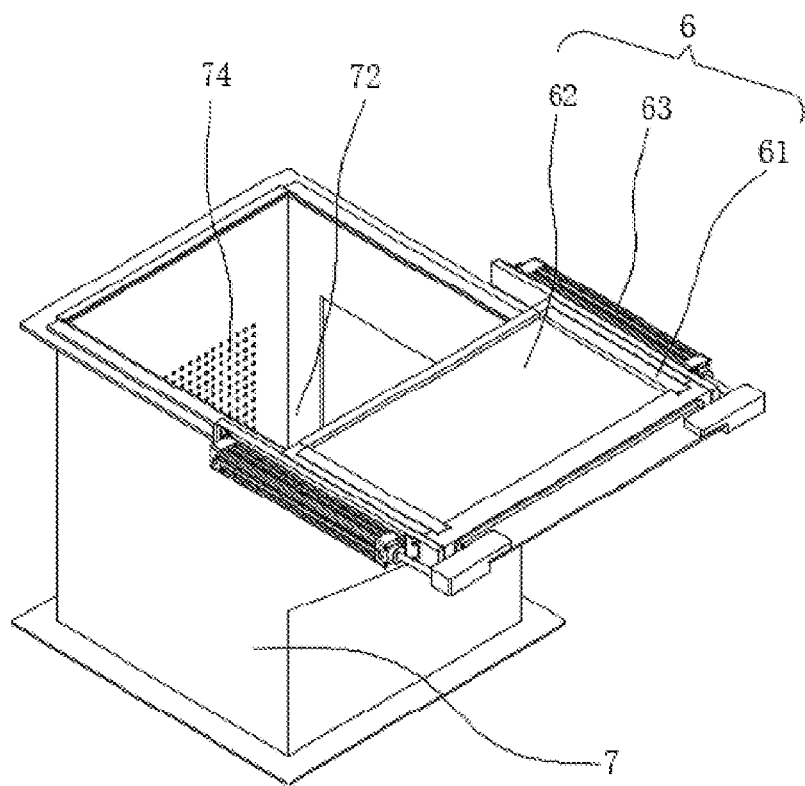
FIG. 5 is a schematic structural diagram of a pressing tank in one embodiment of the present application.

As shown in FIG. 2, FIG. 3 and FIG. 5, in some embodiments, the pressing tank 7 includes a blanking chamber 71, a pressing chamber 72 and a guide member 73. The blanking chamber 71 is configured for receiving the wastes of the temporary storage tank 1 through the first blanking port 5. For example, the blanking chamber 71 directly faces the first blanking port 5, and is located below the first blanking port 5. The wastes first enter the blanking chamber 71 after falling off from the first blanking port 5. The pressing chamber 72 is configured for receiving the wastes from the blanking chamber 71 and defining a compression region for the wastes. The guide member 73 is configured for guiding the wastes from the blanking chamber 71 into the pressing chamber 72.

Since the wastes are relatively concentrated when falling off from the first blanking port 5, if the wastes are directly compressed by the pressing mechanism 8 at this time, the density of the compressed waste block may not be uniform enough. The wastes in some regions are relatively dense and are not easily scattered, but the wastes in other regions are relatively incompact and are easily scattered in the cleaning and handling processes. In addition, the granular wastes will not be tightly pressed and wrapped in the waste block and are easily scattered in the cleaning and handling processes, causing environmental pollution and causing safety accidents such as personnel and component scratches.

Therefore, it is necessary to make the wastes falling from the first blanking port 5 first fall into the blanking chamber 71, and then enter the pressing chamber 72 through the guide member 73. In this process, the relatively concentrated wastes are dispersed, which is convenient for compression.

In some embodiments, the guide member 73 is a plate component located between the blanking chamber 71 and the pressing chamber 72, and the wastes slides down into the pressing chamber 72 along the plate component after entering the blanking chamber 71.

In some other embodiments, the guide member 73 is one of the side walls of the pressing tank 7. The side wall can be set to be inclined. An end with a higher side wall corresponds to the blanking chamber 71, and an end with a lower side wall corresponds to the pressing chamber 72.

By means of the above solution, the relatively concentrated wastes discharged from the first blanking port 5 is dispersed in the pressing chamber 72 through the blanking chamber 71 and the guide member 73, so that the metal waste block compressed by the pressing mechanism 8 is more uniform in density at different positions, and is not easy to disperse, which facilitates the cleaning and transportation of the waste block.

As shown in FIG. 3, in some embodiments, second gas holes 74 are formed in the side wall of the pressing chamber 72 away from the blanking chamber 71. The second gas holes 74 are connected outside the pressing tank 7 with the gas pressure control device (not shown in the figure) to enable the wastes to fall to one side of the pressing chamber 72 away from the blanking chamber 71.

Under the action of their own gravity, the wastes will be preferentially accumulated on one side of the pressing chamber 72 close to the blanking chamber 71, which may cause the wastes to be distributed in the pressing chamber 72 non-uniformly and reduce the compactness of a pressing-molded waste block. The gas pressure control device drives, by means of making the gas flow in the pressing chamber 72 to flow close to the second gas holes 74, the wastes to move away from the blanking chamber 71, which helps to uniformly distribute the wastes in the pressing chamber 72 and in turn helps to improve the quality of the pressing-molded waste block and prevent the waste block from being scattered in cleaning and transportation.

Figure 6:
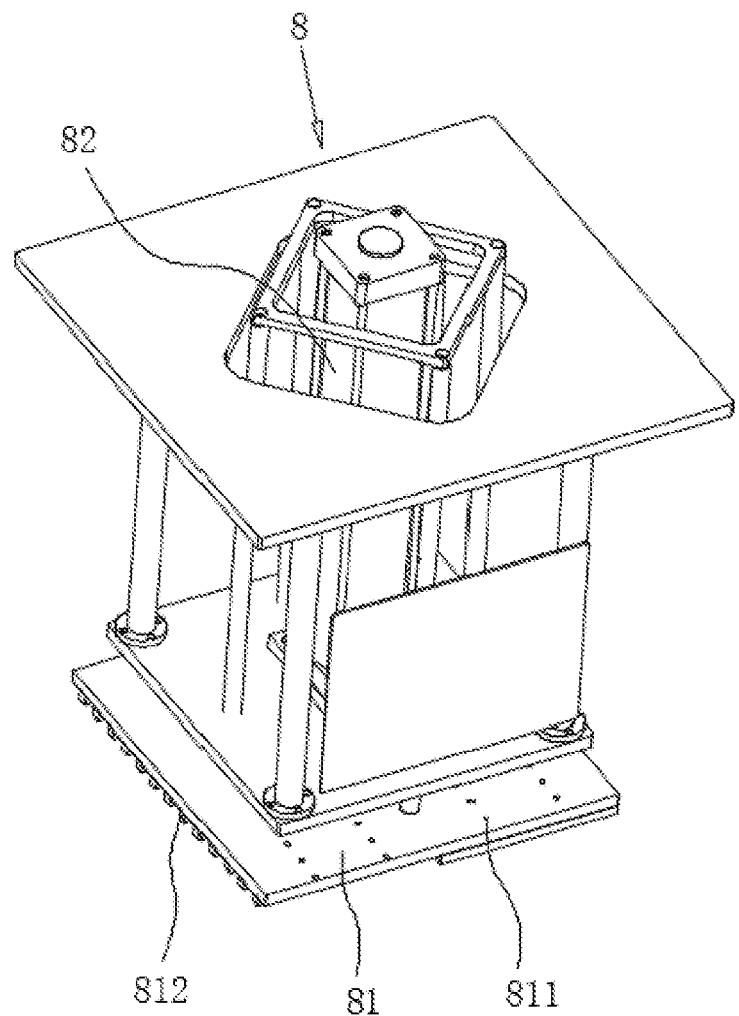
FIG. 6 is a schematic structural diagram of a pressing mechanism in one embodiment of the present application.

As shown in FIG. 2 and FIG. 6, in some embodiments, the pressing mechanism 8 includes a pressing plate 81, which is configured for compressing the wastes in the pressing chamber 72. The pressing plate 81 is provided with third gas holes 811 passing through two sides thereof. The third gas holes 811 are configured for discharging the gas between the wastes while the wastes are compressed.

In some embodiments, multiple third gas holes 811 are formed in the pressing plate 81. The multiple third gas holes 811 are configured for discharging the gas between the wastes at different positions.

In some embodiments, the pressing plate 81 is located in the pressing chamber 72, and can be driven manually or by a driving member to approach a certain side wall of the pressing chamber 72.

For example, as shown in FIG. 2, in one embodiment, considering that the wastes will fall to the bottom of the pressing chamber 72 under the action of their own gravity, the pressing plate 81 is arranged at a top of the pressing chamber 72, and a second cylinder 82 is arranged outside of the pressing tank 7. The second cylinder 82 is vertically arranged. A piston rod of the second cylinder 82 extends from a top wall of the pressing tank 7 into the pressing chamber 72, and is connected with the pressing plate 81 in the pressing chamber 72.

As shown in FIG. 2, in some embodiments, in order to make the pressing-molded waste block more regular for transportation, side walls are arranged around the bottom wall of the pressing chamber 72. During the compression of the wastes, an edge of the pressing plate 81 is in contact with the side walls of the pressing chamber 72, thereby limiting the wastes among the pressing plate 81, the side walls of the pressing chamber 72 and the bottom wall of the pressing chamber 72.

The piston rod of the second cylinder 82 extends out to drives the pressing plate 81 to be close to the bottom wall of the pressing chamber 72, and the volume of the wastes in the pressing chamber 72 is gradually reduced in this process, so that the wastes are pressed to deform and be compact. When the wastes are being compact, the gas in spaces between the wastes needs to be discharged. At this time, the gas between the wastes can be discharged from the third gas holes 811, so that the pressing plate 81 can continue to move to press the wastes.

As shown in FIG. 6, in some embodiments, one side of the pressing plate 81 in contact with the wastes has protruding support blocks 812, which are configured for pressing the wastes, and the support blocks 812 are arranged in a manner of avoiding the third gas holes 811.

By means of the above solution, the support block 812 is located between the pressing plate 81 and the wastes, which prevents the third gas holes 811 from being blocked due to a too close contact between the third gas holes and the wastes in the process of pressing the wastes to affect the discharging of the gas between the wastes. Meanwhile, the support block 812 can improve the overall strength of the pressing plate 81 and can prevent an edge of the pressing plate 81 from upwarping away from the wastes since the deformation will loosen the edge of the waste block, and the pressing-molded waste block is prevented from being broken up.

In some embodiments, the support blocks 812 are non-metal blocks.

Exemplarily, the support block 812 may be a polyurethane block, a ceramic block or a plastic block. The support block 812 may be in the shape of bar, ring, wave, column or the like, which depends on distribution positions of the third gas holes 811, as long as the arrangement of the support blocks 812 can avoid the third gas holes 811.

By means of the above solution, the support block 812 is in direct contact with the metal wastes, thereby preventing the metal wastes from being in direct contact with the pressing plate 81 and from scratching and damaging the pressing plate 81 under a high pressure.

Figure 7:
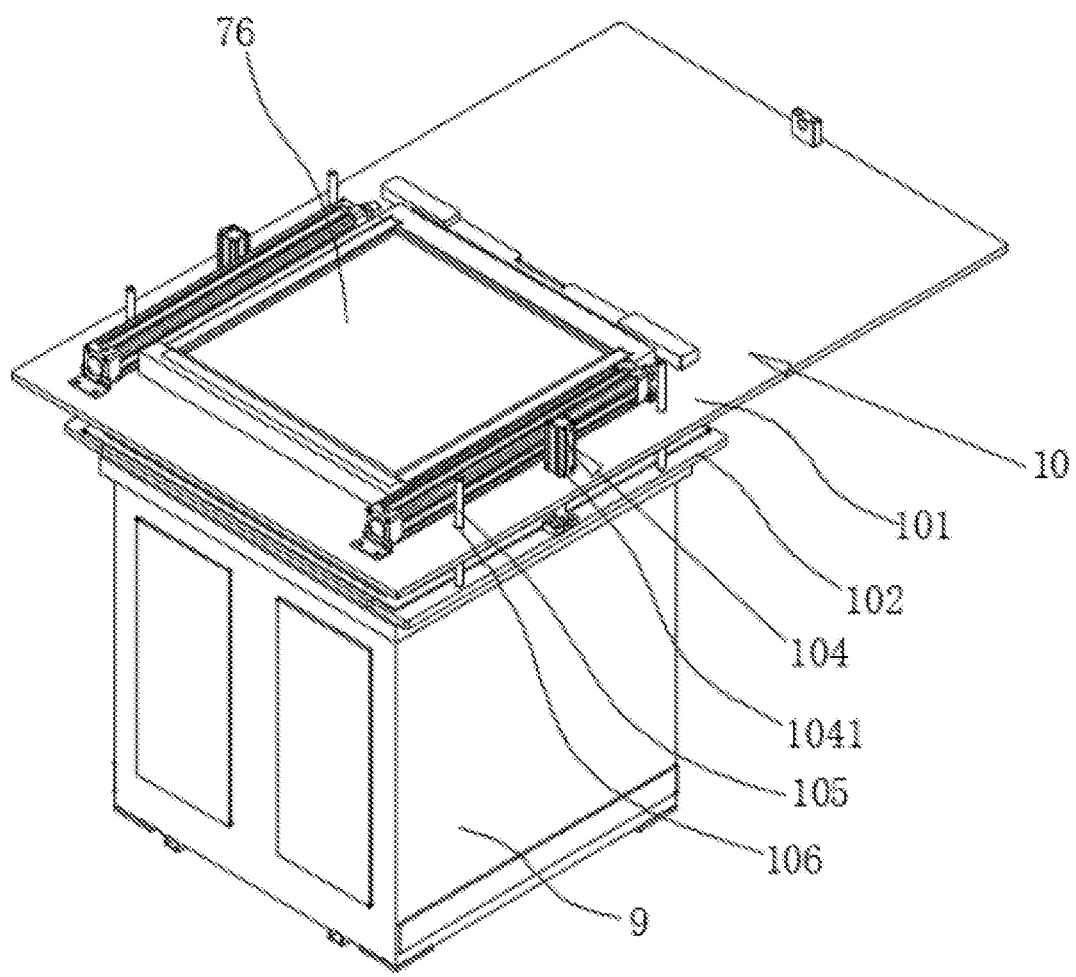
FIG. 7 is a schematic assembling structural diagram of a waste bin, a sealing assembly and a second valve in one embodiment of the present application.

As shown in FIG. 2 and FIG. 7, in some embodiments, the waste collection equipment further includes a waste bin 9. The waste bin 9 is configured for collecting the wastes in the pressing tank 7.

The waste block that has been compressed in the pressing tank 7 is collected in the waste bin 9, thereby freeing up the space in the pressing tank 7 for the wastes in the temporary storage tank 1. In addition, the waste bin 9 can temporarily store the waste block. Since the wastes in the waste block have a large density, a waste bin 9 with the same capacity can accommodate more wastes, and a time interval between two adjacent cleanings of the waste bin 9 is longer, which reduces the frequency of manual cleaning of wastes.

Figure 8:
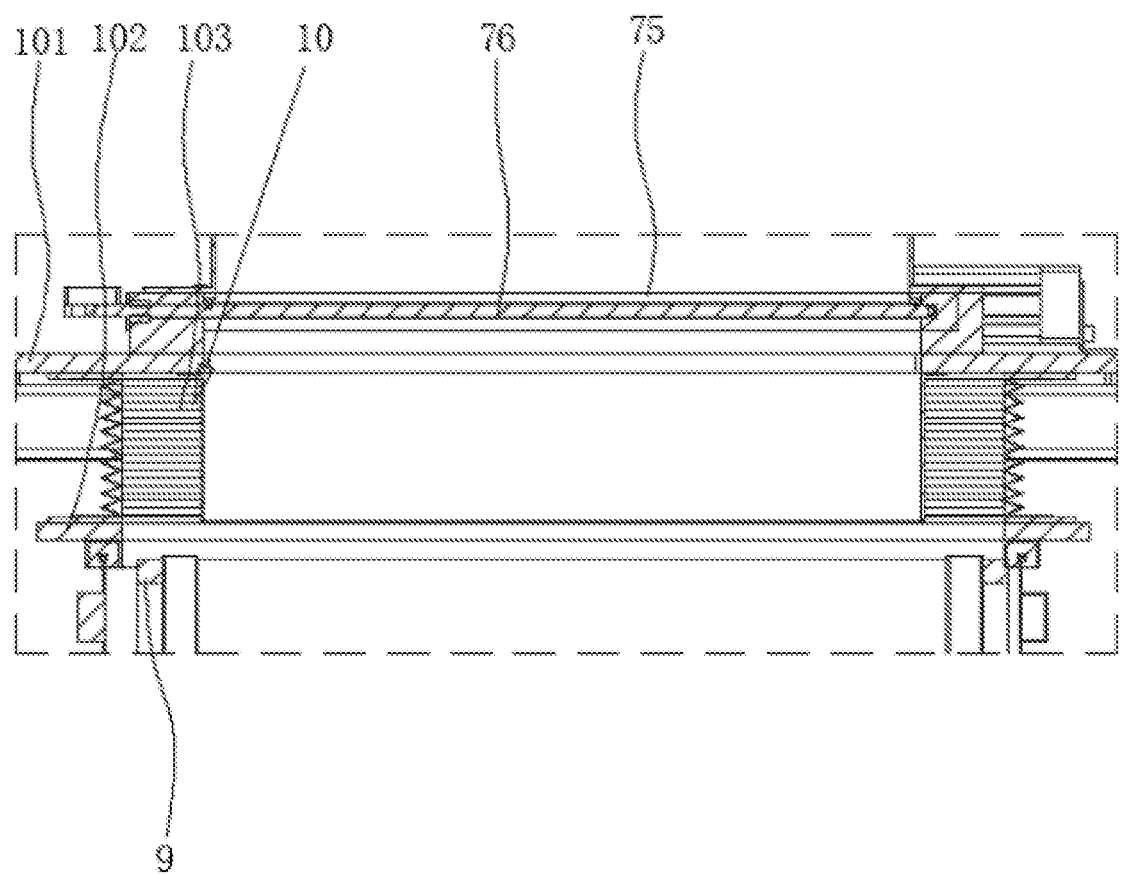
FIG. 8 is a schematic enlarged structural diagram of portion B in FIG. 2.

As shown in FIG. 2, FIG. 7 and FIG. 8, in some embodiments, the bottom of the pressing tank 7 has a second blanking port 75. The second blanking port 75 is provided with a second valve 76. The second valve 76 is configured for controlling the opening or closing of the second blanking port 75, so as to control whether the second blanking port 75 discharges the pressing-molded waste block. The second valve 76 may be a standard member or a non-standard member.

As shown in FIG. 7, in some embodiments, the structure of the second valve 76 is the same as that of the first valve 6, which will not be repeated in this embodiment of the present application.

It should be noted that in order to realize sealing between the pressing tank 7 and the waste bin 9, a sealant tape (not shown in the figure) can be arranged at an inner edge of the second blanking port 75. When the second valve 76 is closed, the sealant tape realizes sealing between the second valve 76 and the second blanking port 75, so that the gas pressure control device can control the gas pressure in the pressing tank 7 through the second gas holes 74.

As shown in FIG. 2 and FIG. 8, in some embodiments, the waste bin 9 is located directly below the second blanking port 75, and a top of the waste bin 9 is provided with an opening, so that the waste block can directly fall into the waste bin 9 after falling off from the second blanking port 75.

When the waste bin 9 is in use, a waste band can be sleeved inside, such as a plastic bag and nylon bag, and a plastic bag shaping device in the existing technology can be compounded on an inner wall or the opening of waste bin 9 to spread the opening of the waste bag to facilitate the falling of the waste block. The embodiment of the present application does not limit the use of the waste bin 9.

As shown in FIG. 7 and FIG. 8, FIG. 7 is a schematic assembling structural diagram of the waste bin 9, a sealing assembly 10 and the second valve 76, and FIG. 8 is a schematic enlarged structural diagram of portion B in FIG. 2. In some embodiments, a sealing assembly 10 is arranged between the bottom wall of the pressing tank 7 and the waste bin 9 to prevent the wastes from spilling out of the waste bin 9. The sealing assembly 10 includes an upper sealing plate 101, a lower sealing plate 102 and a sealing cover 103.

The upper sealing plate 101 is connected to the bottom of the pressing tank 7. The lower sealing plate 102 is configured for pressing against an edge of an opening of the waste bin 9. The sealing cover 103 is connected between the upper sealing plate 101 and the lower sealing plate 102 to realize sealing between the upper sealing plate 101 and the lower sealing plate 102.

An opening is formed in a position of the upper sealing plate 101 corresponding to the second blanking port 75, and the size of the opening in the upper sealing plate 101 is greater than or equal to that of the second blanking port 75, so that the wastes in the pressing tank 7 can fall off smoothly.

An opening is also formed in the lower sealing plate 102, and the size of the opening in the lower sealing plate 102 is also greater than or equal to that of the second blanking port 75, so that the wastes in the pressing tank 7 can smoothly fall into the waste bin 9 through the second blanking port 75 and the opening in the upper sealing plate 101.

The sealing cover 103 is located between the upper sealing plate 101 and the lower sealing plate 102, and is disposed around the opening in the upper sealing plate 101 and the opening in the lower sealing plate 102. When the wastes fall off from the second blanking port 75 into the waste bin 9 through the opening in the upper sealing plate 101 and the opening in the lower sealing plate 102, no wastes will fall out from a space between the upper sealing plate 101 and the lower sealing plate 102.

By means of the above solution, the sealing assembly 10 realizes the sealing between the pressing tank 7 and the waste bin 9, which prevents smaller waste particles from falling out from the edge of the opening of the waste bin 9 when the waste block falls from the pressing tank 7 to the waste bin 9.

In some embodiments, the sealing cover 103 can extend and retract between the upper sealing plate 101 and the lower sealing plate 102 to adapt to a distance between the upper sealing plate 101 and the lower sealing plate 102. For example, the sealing cover 103 is an organ cover.

As shown in FIG. 7, in some embodiments, the sealing assembly 10 also includes a driving member 104. The driving member 104 is configured for driving the lower sealing plate 102 to move relative to the upper sealing plate 101, so that the lower sealing plate 102 presses against or is separated from the edge of the opening of the waste bin 9.

In some embodiments, the driving member 104 is fixed on the upper sealing plate 101 and drives the lower sealing plate 102 to move close to or away from the upper sealing plate 101.

For example, the driving member 104 includes a third cylinder 1041. A cylinder body of the third cylinder 1041 is fixed on the upper sealing plate 101. A piston rod of the third cylinder 1041 is connected on the lower sealing plate 102. The piston rod of the third cylinder 1041 extends out to drive the lower sealing plate 102 to be away from the upper sealing plate 101. The piston rod of the third cylinder 1041 retracts back to drive the lower sealing plate 102 to be close to the upper sealing plate 101.

Or, in another embodiment, the driving member 104 includes a motor and a screw rod. The upper sealing plate 101 is rotatably connected with the screw rod. The screw rod and the lower sealing plate 102 are connected through a screw nut structure. An electrode drives the screw rod to rotate, so that the lower sealing plate 102 moves along an axial direction of the screw rod, so as to be close to or away from the upper sealing plate 101.

In some embodiments, a guide rod 105 is connected to the lower sealing plate 102, and the guide rod 105 extends to a side where the upper sealing plate 101 is located. A guide hole 106 is formed in the upper sealing plate 101, and the guide rod 105 penetrates through the guide hole 106. When the driving member 104 drives the lower sealing plate 102 to be close to or away from the upper sealing plate 101, an outer wall of the guide rod 105 fits an inner wall of the guide hole 106, so that the lower sealing plate 102 moves along a fixed direction.

By means of the above solution, when the driving member 104 drives the lower sealing plate 102 to be separated from the opening of the waste bin 9, the waste bin 9 can be taken out, and the waste block collected in the waste bin 9 can be cleaned. When the wastes in the waste bin 9 are cleaned up, the waste bin 9 is placed at an original position, and the driving member 104 drives the lower sealing plate 102 to be close to the edge of the opening of the waste bin 9 and to press against the edge of the opening of the waste bin 9, thereby continuing to achieve sealing between the pressing tank 7 and the waste bin 9.

In some embodiments, the bottom of the lower sealing plate 102 is provided with a buffer component, such as foam, a rubber sheet, and a plastic strip. The buffer component is in direct contact with the opening in the top of the waste bin 9 to prevent a harsh collision or impact caused at the moment when the lower sealing plate 102 presses against the waste bin 9.

As shown in FIG. 1 and FIG. 2, in some embodiments, waste collection equipment includes a frame 20, a temporary storage tank 1, a pressing tank 7, a pressing mechanism 8 and a waste bin 9. The frame 20 is a box-type structure. The temporary storage tank 1, the pressing tank 7, the pressing mechanism 8 and the waste bin 9 are all arranged in the frame 20. The temporary storage tank 1 is located at the upper side in the frame 20. The position of the pressing tank 7 is lower than the position of temporary storage tank 1. Temporary storage tank 1 and the pressing mechanism 8 are arranged above the pressing tank 7 side by side, and an inner space of the pressing tank 7 is divided into a blanking chamber 71 and a pressing chamber 72. The bottom wall of the blanking chamber 71 is inclined to form a guide member 73. The guide member 73 tilts downwards from one side away from the pressing chamber 72 to one side close to the pressing chamber 72, so that the wastes falling into the blanking chamber 71 can enter the pressing chamber 72. The top of the blanking chamber 71 corresponds to the temporary storage tank 1. The top of the pressing chamber 72 corresponds to the pressing mechanism 8. The bottom of the pressing chamber 72 corresponds to the waste bin 9.

During use, wastes produced by battery manufacturing equipment flow into the temporary storage tank 1, then flow into the blanking chamber 71 through the first blanking port 5 at the bottom of the temporary storage tank 1, and finally flow to the pressure chamber 72 along the bottom wall of the blanking chamber 71. When there is a predetermined number of wastes in the pressing chamber 72, the pressing mechanism 8 is started for compression, and a first-stage valve (the first valve 6) is closed at the same time. After the pressing is completed, a second-stage valve (the second valve 76, which is always closed before) is opened, so that the compressed solid waste block falls into the waste bin 9. The second-stage valve is closed, and the first-stage valve is opened. The above actions are repeated for waste collection until the waste bin 9 is full. The waste bin 9 is pulled out to deal with the wastes in the waste bin 9. In this process, the equipment will not be stopped, and the wastes produced by the equipment is temporarily stored in the temporary storage tank 1 and the pressing tank 7.

It should be noted that in the above process, one waste block can be pressed to be molded in multiple times according to a preset volume of a waste block. For example, when a predetermined number of incompact wastes are accumulated in the pressing chamber 72 for the first time, the pressing mechanism 8 presses the existing wastes in the pressing chamber 72 into a smaller-volume waste block, and then retracts back. At this time, the volume of the waste block is small and is not equal to a preset volume, so the waste block is not discharged into the waste bin 9. The pressing chamber 72 collects the wastes from the temporary storage tank 1 again. After there is a certain number of the wastes, some incompact wastes are superimposed on the top of the original waste block, and they are compressed together. The above actions are repeated for many times until the final molded waste block has the preset volume. The second valve 76 is then opened to discharge the wastes from the pressing chamber 72 into the waste bin 9.

A time interval for pressing by the pressing mechanism 8 can be set according to a volume of the pressing chamber 72, a speed at which the wastes enter the waste bin 9 or a volume of the wastes in the pressing chamber 72. For example, a sensor is arranged in the pressing chamber 72. When the wastes in the pressing chamber 72 are accumulated to a certain amount, the pressing mechanism 8 presses the wastes once. Or, in terms of time, the pressing mechanism 8 acts once every 30 minutes, which is not limited in this embodiment of the present application.

To sum up, the above waste collection equipment collects the wastes through the temporary storage tank 1 to prevent the wastes from being scattered in a workshop and affecting the safety of the environment, people and equipment in the workshop. The wastes are compressed by the pressing mechanism 8, thereby reducing the space occupied by the wastes and reducing the frequency of cleaning the wastes. The first blanking port 5 is arranged between the temporary storage tank 1 and the pressing tank 7, and the first valve 6 is arranged at the first blanking port 5, so that the wastes in the temporary storage tank 1 can be directly discharged into the pressing tank 7 by means of opening the first valve 6.

Those skilled in the art can understand that although some embodiments herein include certain features included in other embodiments, combinations of features of different embodiments are meant to fall within the scope of the present application and form different embodiments. For example, in the claims, any one of the claimed embodiments can be used in any combinations.

According to the above, the above embodiments are only to describe the technical solutions of the present application, instead of limiting the technical solutions. Although the present application has been described in detail with reference to the foregoing embodiments, it should be understood by those ordinarily skilled in the art that: they can still make modifications to the technical solutions described in all the foregoing embodiments, or make equivalent substitutions to some of the technical features therein. These modifications or substitutions will not make the essences of the corresponding technical solutions depart from the spirits and scopes of the technical solutions of all the embodiments of the present application.

What is claimed is:

1. A waste collection equipment, comprising:
   a temporary storage tank configured for receiving and temporarily storing wastes produced by die cutting equipment;
   a pressing tank configured for carrying the wastes in the temporary storage tank; and
   a pressing mechanism configured for compressing the wastes in the pressing tank; and,
   wherein the temporary storage tank is provided with a first blanking port configured for communicating the temporary storage tank with the pressing tank, wherein the first blanking port is provided with a first valve, and the first valve is configured for opening or closing the first blanking port to control whether the temporary storage tank discharges the waste; and, wherein the waste collection equipment further comprises
   a waste pipe, which is configured for making the wastes produced by the die cutting equipment flow into the temporary storage tank through the waste pipe; and
   a gas pressure control device, configured for controlling a gas pressure in the temporary storage tank to be less than the gas pressure of a feed port of the waste pipe to change the speed at which the wastes flow into the temporary storage tank through the waste pipe, wherein the gas pressure control device is connected with a gas pressure pipe, the gas pressure pipe is at least partially located in the temporary storage tank, and a pipewall of the gas pressure pipe is provided with a gas pressure control port, and wherein the gas pressure control port is configured for enabling an inner cavity of the gas pressure pipe to be in gas communication with the temporary storage tank to control the gas pressure in the temporary storage tank.

2. The waste collection equipment according to claim 1, wherein multiple penetrated first gas holes are arranged on a side wall of the temporary storage tank to receive external gas flow, so that the wastes fall off from the first blanking port.

3. The waste collection equipment according to claim 1, wherein sections of the temporary storage tank along a horizontal direction narrow gradually from top to bottom, and the first blanking port is located on the smallest section of the temporary storage tank, to reduce remaining wastes in the temporary storage tank.

4. The waste collection equipment according to claim 1, wherein a part of the gas pressure pipe located inside the temporary storage tank is located at an inner upper side of the temporary storage tank to prevent the wastes from blocking the gas pressure control port.

5. The waste collection equipment according to claim 1, wherein an isolation plate is arranged inside the temporary storage tank and is configured for isolating the gas pressure control port from a discharge port of the waste pipe, and two sides of the isolation plate are in gas communication.

6. The waste collection equipment according to claim 1, wherein the pressing tank comprises:
    a blanking chamber, which is configured for receiving the wastes from the temporary storage tank through the first blanking port;
    a pressing chamber, which is configured for receiving the wastes from the blanking chamber and defining a compression region for the wastes; and
    a guide member, which is configured for guiding the wastes from the blanking chamber into the pressing chamber.

7. The waste collection equipment according to claim 6, wherein second gas holes are formed in a side wall of the pressing chamber away from the blanking chamber; and the second gas holes are connected outside the pressing tank with a gas pressure control device to enable the wastes to fall to one side of the pressing chamber away from the blanking chamber.

8. The waste collection equipment according to claim 6, wherein the pressing mechanism comprises a pressing plate, which is configured for compressing the wastes in the pressing chamber; the pressing plate is provided with third gas holes passing through two sides thereof, and the third gas holes are configured for discharging the gas between the wastes while the wastes are compressed.

9. The waste collection equipment according to claim 8, wherein one side of the pressing plate in contact with the wastes has protruding support blocks, which are configured for pressing the wastes, and the support blocks are arranged in a manner of avoiding the third gas holes.

10. The waste collection equipment according to claim 9, wherein the support blocks are non-metal blocks.

11. The waste collection equipment according to claim 1, wherein the waste collection equipment further comprises a waste bin, which is configured for collecting the wastes in the pressing tank.

12. The waste collection equipment according to claim 11, wherein a sealing assembly is arranged between a bottom wall of the pressing tank and the waste bin, and is configured for preventing the wastes from spilling out of the waste bin; and the sealing assembly comprises:
    an upper sealing plate, which is connected to the bottom of the pressing tank;
    a lower sealing plate, which is configured for pressing against an edge of an opening of the waste bin; and
    a sealing cover, which is connected between the upper sealing plate and the lower sealing plate to realize sealing between the upper sealing plate and the lower sealing plate.

13. The waste collection equipment according to claim 12, wherein the sealing assembly further comprises:
    a driving member, which is configured for driving the lower sealing plate to move relative to the upper sealing plate, so that the lower sealing plate presses against or is separated from the edge of an opening of the waste bin.

* * * * *